United States Patent [19]

Pal

[11] Patent Number: 5,481,565
[45] Date of Patent: Jan. 2, 1996

[54] METHOD AND APPARATUS FOR CHANNEL EQUALIZATION

[75] Inventor: Debajyoti Pal, Middletown, N.J.

[73] Assignee: AT&T Corp., Murray Hill, N.J.

[21] Appl. No.: 139,600

[22] Filed: Oct. 18, 1993

[51] Int. Cl.$^6$ .................................................... H03H 7/30
[52] U.S. Cl. ........................................... 375/232; 375/229
[58] Field of Search .................................. 375/13, 14, 11, 375/233, 234; 333/18

[56] References Cited

U.S. PATENT DOCUMENTS

| | | | |
|---|---|---|---|
| 5,111,481 | 5/1992 | Chen et al. | 375/14 |
| 5,175,746 | 12/1992 | Inoue et al. | 375/14 |
| 5,268,930 | 12/1993 | Sendyk et al. | 375/14 |

OTHER PUBLICATIONS

European Search Report date Jan. 26, 1995, regarding EPO Application No. EP 94 30 7272.
"Fractionally Spaced Semi-Blind Decision Feedback Equalization of Wireless Channels" Publication date: May 23, 1993. Listed as particularly relevant if taken alone in the European Search Report regarding EP 94 30 7272.
EP-A-O 541 225 filed Sep. 9, 1992. Listed as particularly relevant if taken alone in the European Search Report regarding EP 94 30 7272.
"A Modular Approach to the Hardware Implementation of Digital Filters" Publication Date: Sep. 1976. Listed as technological background in European Search Report regarding EP 94 30 7272.
"Fractional Tap-Spacing Equalizer and Consequences for Clock Recovery in Data Modems" by G. Ungerboeck, IEEE Transactions on Communications, vol. COM-24, No. 8, Aug., 1976, pp. 856-864, New York, N.Y. 10017.

*Primary Examiner*—Stephen Chin
*Assistant Examiner*—T. Ghebretinsae
*Attorney, Agent, or Firm*—Christopher N. Malvone

[57] ABSTRACT

An equalizer compensates for changing transmission characteristics of a communication channel by changing the number of prior symbols, and the value of coefficients that it uses to filter a received signal. The number of prior symbols, and the value of the coefficients are determined using a set of training symbols that are received from the communication channel.

9 Claims, 4 Drawing Sheets

METHOD AND APPARATUS FOR CHANNEL EQUALIZATION

TECHNICAL FIELD

The present invention relates to communications; more specifically, to equalization of a communication channel.

DESCRIPTION OF THE PRIOR ART

Information is typically passed over a communication channel in the form of a signal that represents a symbol from a known symbol constellation. The transmission characteristics of the communication channel alter the signal and make it difficult to identify the symbol at a receiver.

In the past, adaptive filters were used as channel equalizers to compensate for the transmission characteristics of a communication channel. The communication channel may be a wireless channel or a wired channel. FIG. 1 illustrates a prior channel equalizer. A received signal passes through analog-to-digital (A/D) converter 10 and into a shift register or RAM 12. Shift register 12 is broken into nine segments in this example. The nine segments consist of three groups of three segments, where each group of three segments correspond to a symbol period. As a result, shift register 12 stores two prior symbols and the current symbol, with three samples of each symbol. Each sample contained in the shift register is multiplied by a coefficient C using one of multipliers 14. The outputs of multipliers 14 are summed in adder 16. Adder 16 provides its output, which may be complex, to decision unit 18. Decision unit 18 identifies the symbol $S_k$ by determining which symbol in the symbol constellation most closely matches the signal received from summer 16. Decision unit 18 is well-known in the art and is sometimes referred to as a slicer in modem applications. It should be noted that the equalizer of FIG. 1 is considered a fractionally-spaced equalizer because it samples the incoming signal at a rate faster than the symbol rate. As a result of having several samples per symbol, a fractionally-spaced equalizer is less sensitive to the phase variations in the incoming signal. It should also be noted that the equalizer of FIG. 1 is adaptive in that the coefficients C are changed based on changing channel conditions. For the sake of simplicity, the mechanism for changing the coefficients is not shown. A similar fractionally spaced equalizer is disclosed in "Fractional Tap-Spacing Equalizer and Consequences for Clock Recovery in Data Modems" by Gottfried Ungerboeck, IEEE Transactions on Communications, Vol. Com-24 No. 8, August 1976, pp. 856–64.

The equalizer of FIG. 1 has the advantage of modifying the value of coefficients C based on changing communication channel characteristics. The channel's transmission characteristics are determined by observing the channel's effect on a set of training symbols that are sent to the equalizer. Unfortunately, when the channel's transmission characteristics change, the equalizer of FIG. 1 does not change the number of prior symbols that are used to compensate for the transmission characteristics. For example, in wireless communication channel over a desert or open space environment, it is desirable to use a small number of prior symbols, and in a congested environment such as an urban environment, it is desirable to use a large number of prior symbols.

SUMMARY OF THE INVENTION

The present invention solves this problem by varying the number of prior symbols used by an equalizer based on a communication channel's transmission characteristics. By optimizing the number of prior symbols to match the communication environment, a larger signal-to-noise ratio may be maintained.

The present invention analyzes a received set of training symbols to determine the number of prior symbols that should be used by the equalizer, as well as the value of the coefficients that will be used to compensate for the channel's transmission characteristics. In addition, the present invention forms m individual sums that may be used to identify a received symbol. Each sum is formed by adding corresponding signal samples from r−1 different symbol periods, where there are m sets of corresponding signal samples. This offers the advantage of identifying a symbol using symbol samples that contain a large amount of energy from the symbol of interest while eliminating samples that contain large amounts of energy associated with past transmitted symbols.

DETAILED DESCRIPTION

Figure 1:
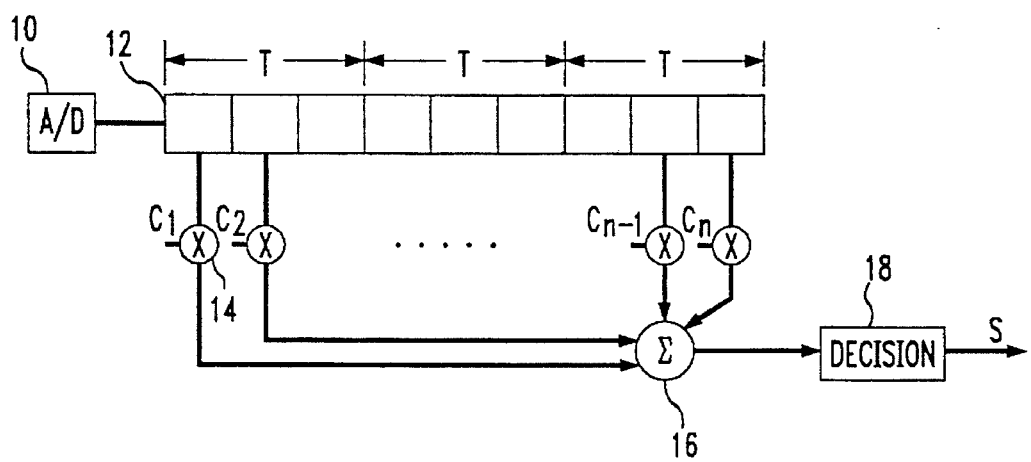
FIG. 1 illustrates a prior fractionally-spaced adaptive equalizer.
Figure 2:
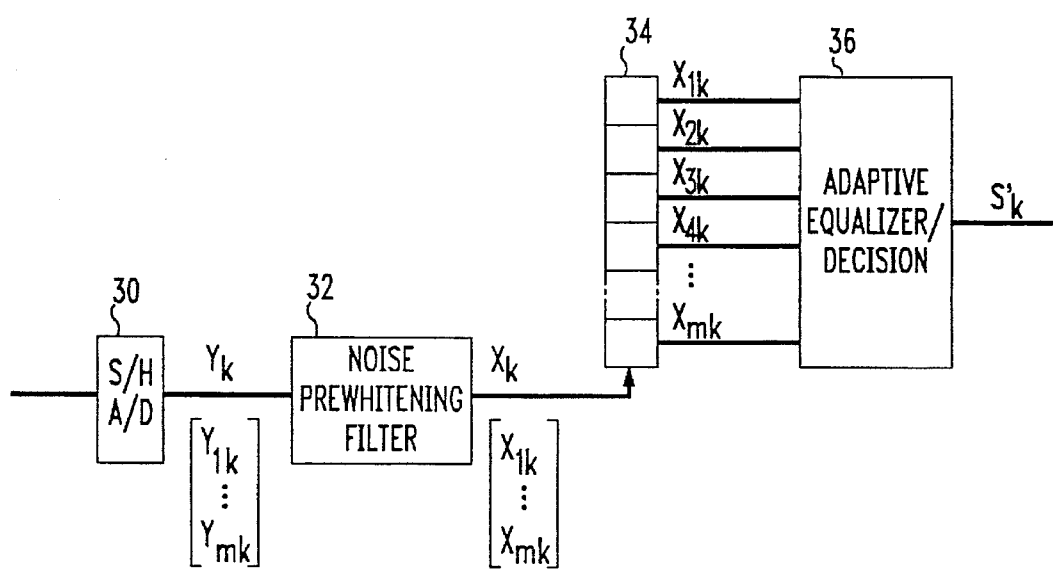
FIG. 2 is a block diagram of the present invention.

FIG. 2 is a block diagram of a receiver with the present invention. Sample and hold (S/H) and analog-to-digital (A/D) converter 30 receive a signal from a communication channel that may be wired or wireless. The S/H and A/D sample the signal m times per symbol period. As a result, for each symbol period, unit 30 produces m outputs labeled $Y_{1,k}$ through $Y_{m,k}$ where the index 1 to m indicates the sample number for a given symbol period, and the index k indicates the symbol period. The value m may be any integer greater than 1; however, in Cellular Standard IS54 channels, m is typically equal to 3 or 4, and in Cellular Standard GSM channels, m may be equal to 8. The signal Y is passed through a noise pre-whitening filter 32, the art, to produce signals $X_{1,k}$ through $X_{m,k}$. Noise pre-whitening filter 32 is used to ensure that the noise received by adaptive equalizer 36 is uncorrelated. Signal X is fed to shift register or RAM 34 which stores one signal sample in each storage location. The m outputs of shift register 34 are provided to adaptive equalizer and decision unit 36 which outputs the received symbol signal $S_k'$.

Noise pre-whitening filter 32 may be implemented by multiplying a Y matrix containing signal samples $Y_{1,k}$ through $Y_{m,k}$ by a P matrix to obtain an X matrix containing signal samples $X_{1,k}$ through $X_{m,k}$. The multiplication may be performed by devices such as a microprocessor, a microcomputer, a programmable signal processor or specialized hardware.

$$\begin{bmatrix} P_{11} & P_{12} & \ldots & P_{1m} \\ P_{21} & & & P_{2m} \\ \cdot & & & \cdot \\ \cdot & & & \cdot \\ \cdot & & & \cdot \\ P_{m1} & P_{m2} & \ldots & P_{mm} \end{bmatrix} \begin{bmatrix} Y_{1k} \\ Y_{2k} \\ \cdot \\ \cdot \\ \cdot \\ Y_{mk} \end{bmatrix} = \begin{bmatrix} X_{1k} \\ X_{2k} \\ \cdot \\ \cdot \\ \cdot \\ X_{mk} \end{bmatrix}$$

Matrix P is calculated starting with the overall transfer function $T(j\omega)$ of the receiver filters preceding pre-whitening filter 32. This transfer function is multiplied by $T(-j\omega)$, and then the inverse Fourier Transform of the product is taken to produce the noise auto-correlation function $A(t)$. A set of m values, $n_1$ to $n_m$, is obtained by determining the value of $A(t)$ at time $t=0$, $t=\Delta t$, $t=2\Delta t$ ... $t=(m-1)\Delta t$, where $\Delta t$ is equal to the sampling period. These m values are used to form auto-covariance matrix N.

$$[N] = \begin{bmatrix} n_1 & n_2 & n_3 & n_4 & \ldots & n_{m-1} & n_m \\ n_2 & n_1 & n_2 & n_3 & \ldots & & n_{m-1} \\ n_3 & n_2 & n_1 & n_2 & \ldots & & n_{m-2} \\ n_4 & n_3 & n_2 & n_1 & \ldots & & n_{m-3} \\ \cdot & \cdot & \cdot & \cdot & & & \cdot \\ \cdot & & & & & & \cdot \\ \cdot & & & & & & n_2 \\ n_m & n_{m-1} & n_{m-2} & n_{m-3}\ldots & & n_2 & n_1 \end{bmatrix}$$

Matrix N is an m×m matrix with the value $n_1$ along its main diagonal. The column entries below the main diagonal start with $n_2$ and increment toward $n_m$ until the entry in the bottom row is filled. The column entries above the main diagonal start with $n_2$ and increment toward $n_m$ until the entry in the top row is filled. A singular value decomposition is performed on matrix N to obtain matrices $U_N$, $\Sigma_N$ and $U_N^*$.

$$[N] \to [U_N][\Sigma_N][U_N^*]$$

$$[P] = [\Sigma_N^{-\frac{1}{2}}][U_N^*]$$

Singular value decomposition is well-known in the art and can be seen, for example, in Matrix Computations, pp. 16–20, by G. H. Golub and C. F. Van Loan, The John Hopkins University Press, Baltimore, Md. 1983. A singular value decomposition may be executed using, for example, Jacobi methods, the QR algorithm or the Golub/Kahan SVD step. The product of matrices $\Sigma_N^{-\frac{1}{2}}$ and $U_N^*$ produces the P matrix which is an m×m matrix. Matrix $\Sigma_N^{-\frac{1}{2}}$ is formed by raising each entry of the $\Sigma_N$ matrix to the $-\frac{1}{2}$ power. The P matrix is calculated when the receiver is manufactured, and the values of the entries of the P matrix may be stored in a non-volatile memory; it is not necessary to recalculate the P matrix unless the filters preceding the equalizer are changed.

Figure 3:
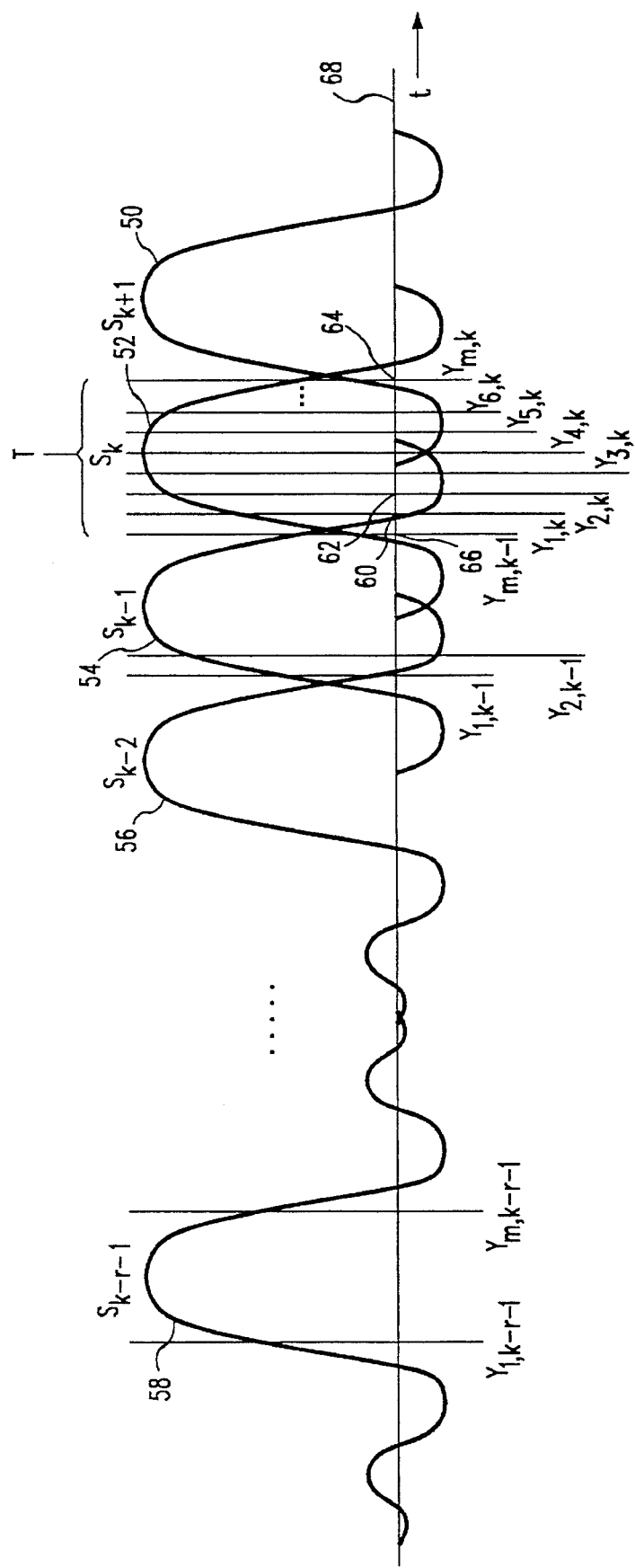
FIG. 3 illustrates sampling symbols received over a communication channel.

FIG. 3 illustrates how a transmitted symbol is sampled to obtain the output signal Y from S/H and A/D 30. Curves 50, 52, 54, 56 and 58 illustrate transmitted symbols $S_{k+1}$, $S_k$, $S_{k-1}$, $S_{k-2}$ and $S_{k-r-1}$, respectively. When sampling symbol $S_k$ at time 60, sample $Y_{1,k}$ is obtained and it comprises a portion of symbol $S_k$ and some of the preceding symbols $S_{k-1}$, $S_{k-2}$ through $S_{k-r-1}$, and even earlier symbols, but to a degree that is insignificant. One sample period later at time 62, sample $Y_{2,k}$ is taken. Likewise at following sample periods, samples $Y_{3,k}$ through $Y_{m,k}$ are taken. It should be noted that point 66 to point 64 on timeline 68 correspond to one symbol period.

$$Y_{1k} = g_{11}' S_k + g_{12}' S_{k-1} + g_{13}' S_{k-2} + \ldots + g_{1r}' S_{k-r-1} \quad (1)$$

Equation 1 illustrates the components of sample $Y_{1,k}$. The equation illustrates that sample $Y_{1,k}$ contains symbol energy from symbol $S_k$ as well as several prior signals. The coefficient g in front of each symbol in equation 1 illustrates the signal contribution made to sample $Y_{1,k}$ by that particular symbol.

$$Y_{2k} = g_{21}' S_k + g_{22}' S_{k-1} + g_{23}' S_{k-2} + \ldots + g_{2r}' S_{k-r-1} \quad (2)$$

$$\vdots$$

$$Y_{mk} = g_{m1}' S_k + g_{m2}' S_{k-1} + g_{m3}' S_{k-2} + \ldots + g_{mr}' S_{k-r-1}$$

Equations 2 similarly describe the components of samples $Y_{2,k}$ through $Y_{m,k}$. If we consider the output of noise pre-whitening filter 32, equations 1 and 2 may be rewritten as shown by equations 3.

$$X_{1k} = g_{11} S_k + g_{12} S_{k-1} + g_{13} S_{k-2} + \ldots + g_{1r} S_{k-r-1} \quad (3)$$
$$X_{2k} = g_{21} S_k + g_{22} S_{k-1} + g_{23} S_{k-2} + \ldots + g_{2r} S_{k-r-1}$$
$$\vdots$$
$$X_{mk} = g_{m1} S_k + g_{m2} S_{k-1} + \ldots + g_{mr} S_{k-2} + g_{mr} S_{k-r-1}$$

Concerning the adaptive equalizer, the coefficients g and the variable r are determined based on how the characteristics of the communication channel modify a set of training symbols that are transmitted over the channel. For example, in some wireless communication systems, transmission periods are broken into frames of 162 symbols that are approximately 41 microseconds long, where the first 14 symbols are training symbols. It should be noted that equations 3 can be rewritten as matrix equation 4 and equation 4 can be written in the form of equation 5.

$$\begin{bmatrix} X_{1k} \\ X_{2k} \\ \cdot \\ \cdot \\ \cdot \\ X_{mk} \end{bmatrix} = \begin{bmatrix} g_{11} & g_{12} & g_{13} & \ldots & g_{1r} \\ g_{21} & g_{22} & g_{23} & \ldots & g_{2r} \\ \cdot & & & & \cdot \\ \cdot & & & & \cdot \\ \cdot & & & & \cdot \\ g_{m1} & g_{m2} & g_{m3} & \ldots & g_{mr} \end{bmatrix} \begin{bmatrix} S_k \\ S_{k-1} \\ S_{k-2} \\ \cdot \\ \cdot \\ \cdot \\ S_{k-r-1} \end{bmatrix} \quad (4)$$

$$[X]' = [G][S] \quad (5)$$

It can be seen that once the values of the entries in matrix G, are determined, matrix G will model the transmission characteristics of the communication channel.

Figure 4:
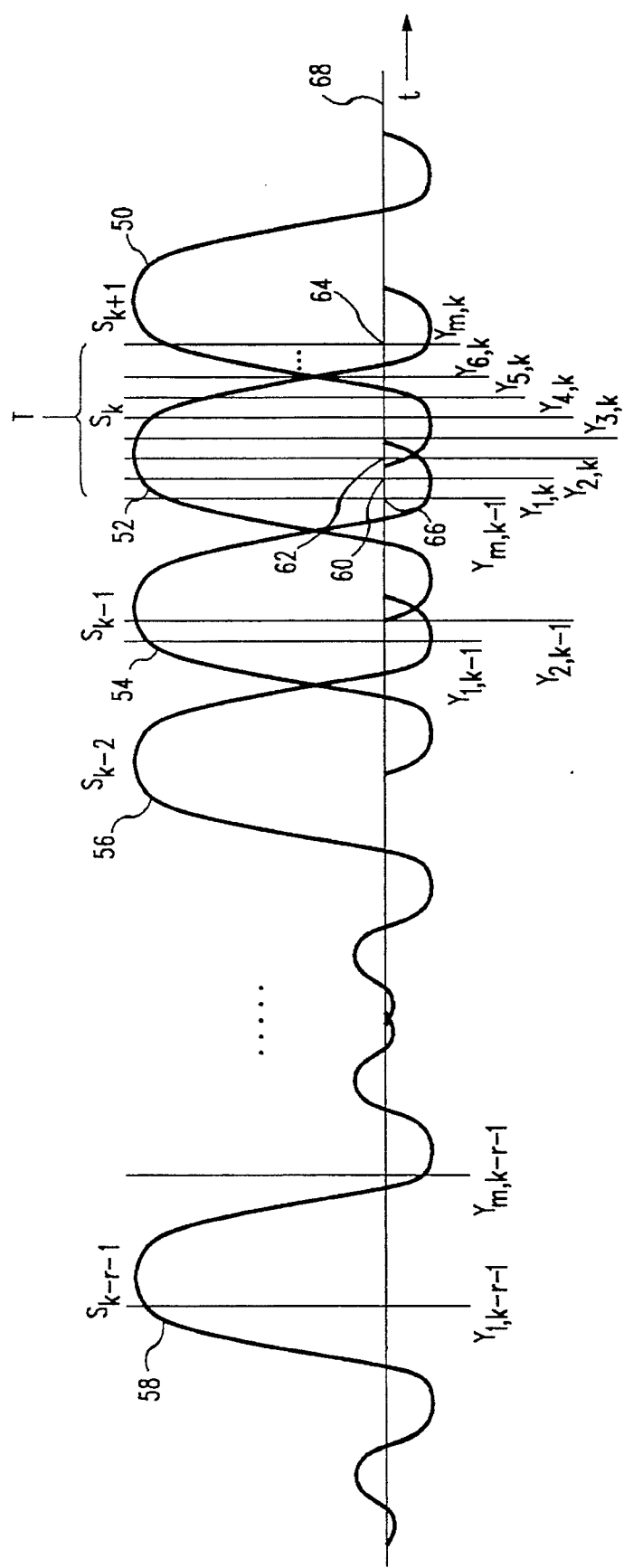
FIG. 4 illustrates sampling signals in a fashion similar to FIG. 3, except that phase relationship between the symbols and the samples has been changed.

It should be noted that in the example of FIG. 3, the phase relationship between the received symbols and the samples are such that the first sample occurs near the beginning of symbol $S_k$ and that the last sample occurs near the end of symbol $S_k$. In this example, when the coefficients g are determined using the training symbols, coefficients $g_{1,1}$ and $g_{m,1}$ would be relatively small while coefficient $g_{5,k}$ may be relatively large. FIG. 4 illustrates the same type of sampling as FIG. 3 except that due to the random initial relationship between the phase of the incoming symbols and the sampling of unit 30, the relationship between the peak of symbol $S_k$ and samples $Y_{1,k}$ through $Y_{m,k}$ has changed. In this situation, coefficients $g_{1,1}$ $g_{2,1}$ and $g_{3,1}$ would be relatively large, while coefficient $g_{m,1}$ would be negative and relatively small. In either case, this random phase relationship is accounted for when the values of the coefficients are determined using the training symbol set.

As mentioned earlier, the values of the entries in the G matrix, and the value r are to be determined using a set of training symbols. As a result, it is desirable to rewrite equation 4 so that it will represent the situation where r symbol period's worth of data have been sampled.

$$\begin{bmatrix} X_{1,k} & X_{1,k-1} & \ldots & X_{1k-r-1} \\ X_{2,k} & X_{2,k-1} & \ldots & X_{2k-r-1} \\ \cdot \\ \cdot \\ \cdot \\ X_{m,k} & X_{m,k-1} & \ldots & X_{m,k-r-1} \end{bmatrix} = \begin{bmatrix} g_{11}, & g_{12}, & g_{13} & \ldots & g_{1r} \\ g_{21}, & g_{22}, & g_{23} & \ldots & g_{2r} \\ \cdot & \cdot \\ \cdot \\ \cdot \\ g_{m1}, & g_{m2}, & g_{m3} & \ldots & g_{mr} \end{bmatrix} \begin{bmatrix} S_k & S_{k-1} & \ldots & S_{k-r-1} \\ S_{k-1} & S_{k-2} & \ldots & S_{k-r-2} \\ S_{k-2} & S_{k-3} & \ldots & S_{k-r-3} \\ \cdot & \cdot & & \cdot \\ \cdot & \cdot & & \cdot \\ \cdot & \cdot & & \cdot \\ S_{k-r-1} & S_{k-r-2} & \ldots & S_{k-2r-1} \end{bmatrix} \tag{6}$$

This is represented by equation 6 where each column of the X matrix represents the m samples associated with one symbol period. Equation 6 is rewritten in the form of equation 7 to simplify notation.

$$[X] = [G][S] \tag{7}$$

By solving for matrix G of equation 7, the communication channel can be modeled and that modeling can be used by the adaptive equalizer to recover symbols from the received data. Equation 7 can be rewritten in the form of equation 8 where the product of matrices U and $\Phi$ equal matrix G.

$$[X] = [U_r][\Phi][S] \tag{8}$$

The first step in determining the entries of matrix G, is determining the value of r and the value of the entries of matrix $U_r$.

This is carried out by forming a time averaged auto-correlation matrix of the received set of training symbols. This is formed by using the samples associated with each symbol period for the training set of symbols to form an auto-correlation matrix $C_k$ which is defined in equation 9.

$$[C]_k = \begin{bmatrix} X_{1k} \\ X_{2k} \\ \cdot \\ \cdot \\ \cdot \\ X_{mk} \end{bmatrix} \begin{bmatrix} X_{1k}^* & X_{2k}^* & \ldots & X_{mk}^* \end{bmatrix} \tag{9}$$

For the m samples resulting from training symbols $S_k$ auto-correlation matrix $C_k$ is formed by multiplying the column matrix by the row matrix where the entries in the row matrix are the complex conjugates of the entries in the column matrix. In a similar manner, an auto-correlation matrix is obtained for each training symbol. As a result, there are a total of T auto-correlation matrices C for a symbol training set having T symbols. These matrices are summed to form a matrix D as shown in equation 10. Finally equation 11 defines the time averaged auto-correlation of the matrix R which is formed by multiplying each entry of matrix D by 1T.

$$[D] = [C]_K + [C]_{K-1} + \cdots + [C]_{K-T-1} \tag{10}$$

$$[R] = [D] \times \frac{1}{T} \tag{11}$$

The time averaged auto-correlation matrix R is then decomposed using singular value decomposition. As a result of the singular value of decomposition, matrix R can be represented as the product of matrices U$\Sigma$ and U*.

$$[R] \rightarrow [U][\Sigma][U^*] \tag{12}$$

$$[\Sigma] = \begin{bmatrix} \sigma_{11} & 0 & 0 \\ 0 & \sigma_{22} & 0 \\ 0 & 0 & \sigma_{33} \\ 0 & 0 & 0 & \sigma_{rr} \\ 0 & 0 & 0 & 0 & \sigma_{r+1,r+1} \\ 0 & \ldots & \ldots & & & \sigma_{mm} \end{bmatrix} \tag{13}$$

The $\Sigma$ matrix is a diagonal matrix with entries equal to 0 in all positions except along the diagonal. The $\Sigma$ matrix is an m by m matrix. The value of r is determined by observing the values of the entries along the diagonal of the $\Sigma$ matrix. The values along the diagonal are related to signal energy and noise energy. At one point along the diagonal when moving from entry 1,1 to entry m,m, there will be a decrease in the value of the entries. This decrease in value is used to determine r. Entry r r is the last entry to have a large value relative to entries r+1, r+1 to m,m. This change in values can be determined by simply comparing the ratios between adjacent entries on the diagonal. When a ratio becomes large relative to the ratios of prior entries on the diagonal position, r,r can be determined. This is illustrated by observing equations 13 and 14.

$$\sigma_{11}/\sigma_{22} = \Delta_1$$

$$\sigma_{22}/\sigma_{33} = \Delta_2$$

$$\sigma_{rr}/\sigma_{r+1,r+1} = \Delta_r \tag{14}$$

The ratio $\Delta_1$ is determined by dividing $\sigma_{11}$ by $\sigma_{22}$ and ratio $\Delta_2$ is determined by dividing $\sigma_{22}$ by $\sigma_{33}$. This is continued until ratio $\Delta_r$ is located which is equal to $\sigma_{rr}$ divided by $\sigma_{r+1,r+1}$. This can be determined by setting a threshold. For example, when the signal to noise ratio is 30 dB or greater, a threshold of 100 may be used. In this example, $\Delta_r$ is identified as the ratio that is greater than 100. If the signal to noise ratio is less, it may be desirable to use a lower threshold. The value of r is the column or row number of the $\Sigma$ matrix that contains the entry $\sigma_{rr}$.

It should be noted that r may be determined without the use of a set of known training symbols. Matrix [R] and therefore matrix [$\Sigma$] are determined without apriori knowledge of the identities of the symbols being received. As a result, determining r does not require a set of known training symbols.

Once the value of r has been determined from the examination of the diagonal of the $\Sigma$ matrix, $U_r$ is simply the first r columns of matrix U of equation 12. After determining the values for the entries in matrix $U_r$, equation 15 is used to determine the value of the entries of matrix $\Phi$.

$$[\Phi] = [U_r^*][X][S^{-1}] \tag{15}$$

Matrix $S^{-1}$ is the inverse of matrix S. Matrix $U_r^*$ is formed using matrix $U_r$. The entries of matrix $U_r$ are replaced with their complex conjugates, and the columns of the resulting matrix form the rows of matrix $U_r^*$. At this point the entries of matrix $\Phi$ can be determined because matrices $U_R^*$, $S^{-1}$ and X are known. $S^{-1}$ is known from the training symbol set, and X is the collection of samples of the received signals resulting from the received training symbols. Note that in equation 15 matrix $S^{-1}$ is truncated to an r×r matrix and matrix X is truncated to an m×r matrix. In addition, the number of samples m, taken during each symbol period, should be greater than the largest expected value of r.

After using equation 15 to determine the value of the entries of matrix $\Phi$, equation 16 is used to determine the entries of matrix G.

$$[G]=[U_r][\Phi] \tag{16}$$

Recall that the values of the entries of matrix $U_r$ are known by using the first r columns of matrix U from equation 12.

To verify that the values of the entries in the G matrix have converged and are not a result obtained during fading, equation 17 is used to produce matrix $\Sigma_r$.

$$[\Phi][\Phi^*]=[\Sigma_r] \tag{17}$$

Matrix $\Sigma_r$ is a diagonal r by r matrix; the value of all entries are 0 except along the diagonal of the matrix as shown in equation 18.

$$[\Sigma_r] = \begin{bmatrix} \sigma'_{11} & 0 & \cdots & 0 \\ 0 & \sigma'_{22} & & \vdots \\ \vdots & & \ddots & 0 \\ 0 & \cdots & & \sigma'_{rr} \end{bmatrix} \tag{18}$$

The values $\sigma'_{11}$ through $\sigma'_{rr}$ are subtracted from the values $\sigma_{11}$ through $\sigma_{rr}$, respectively, of equation 13 to check convergence. The resulting difference for each subtraction operation should be for example, less that 0.2 times the corresponding $\sigma$ of matrix $\Sigma$. After determining that the values of $\sigma$ are acceptable, the communication channel can be modeled by the G matrix. This modeling can be used to construct a receiver as shown in the block diagram of FIG. 5.

Equation 4 can be rewritten in the form of equation 19.

$$\begin{bmatrix} X_{1k} \\ X_{2k} \\ \cdot \\ \cdot \\ \cdot \\ X_{mk} \end{bmatrix} = \begin{bmatrix} g_{11} \\ g_{21} \\ \cdot \\ \cdot \\ \cdot \\ g_{m1} \end{bmatrix} S_k + \begin{bmatrix} g_{12} \\ g_{22} \\ \cdot \\ \cdot \\ \cdot \\ g_{mr} \end{bmatrix} S_{k-1} + \begin{bmatrix} g_{13} \\ g_{23} \\ \cdot \\ \cdot \\ \cdot \\ g_{m3} \end{bmatrix} S_{k-2} \cdots \begin{bmatrix} g_{1r} \\ g_{2r} \\ \cdot \\ \cdot \\ \cdot \\ g_{mr} \end{bmatrix} S_{k-r-1} \tag{19}$$

$$\begin{bmatrix} X_{1k} \\ X_{2k} \\ \cdot \\ \cdot \\ \cdot \\ X_{mk} \end{bmatrix} - \begin{bmatrix} g_{12} \\ g_{22} \\ \cdot \\ \cdot \\ \cdot \\ g_{m2} \end{bmatrix} S_{k-1} - \begin{bmatrix} g_{13} \\ g_{23} \\ \cdot \\ \cdot \\ \cdot \\ g_{m3} \end{bmatrix} S_{k-2} - \cdots - \begin{bmatrix} g_{1r} \\ g_{2r} \\ \cdot \\ \cdot \\ \cdot \\ g_{mr} \end{bmatrix} S_{k-r-1} = \begin{bmatrix} g_{11} S_k \\ g_{21} S_k \\ \cdot \\ \cdot \\ \cdot \\ g_{m1} S_k \end{bmatrix} \tag{20}$$

In solving for $S_k$, which is the most recently received symbol, equation 20 is written. Equation 20 illustrates that by subtracting the vectors or matrices, which consist of prior transmitted symbols multiplied by the appropriate G matrix entries, from a vector or matrix comprising the m samples of signal X during symbol period K most recently-received signal produce a vector or matrix of m samples symbol $S_k$, where each sample symbol $S_k$ is scaled by an entry from the first column of the G matrix.

Figure 5:
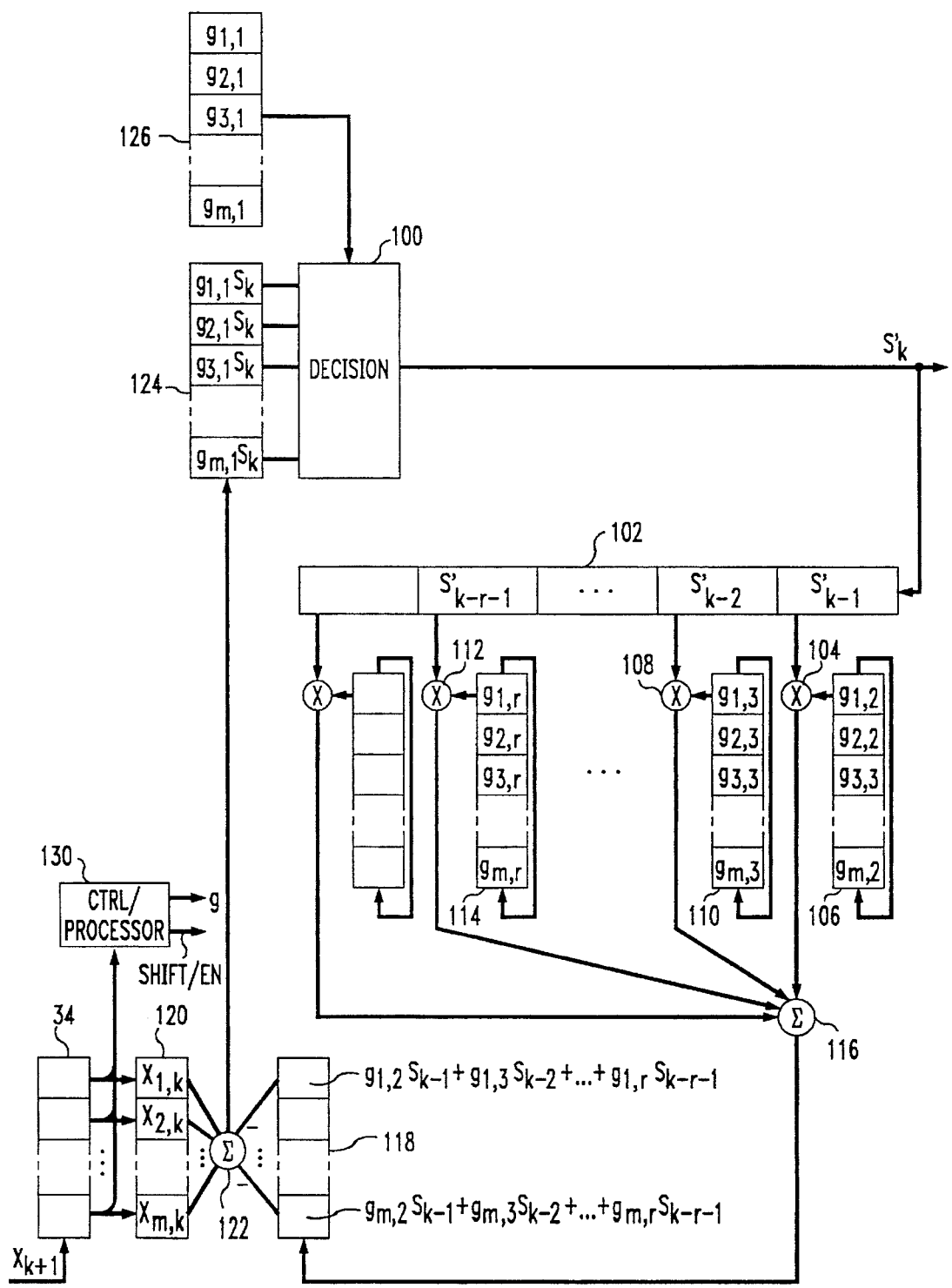
FIG. 5 is a more detailed block diagram of an embodiment of the present invention's adaptive equalizer.

FIG. 5 illustrates a block diagram of a receiver that takes advantage of the relationship illustrated by equation 20.

The block diagram of FIG. 5 uses received symbols identified by decision unit 100 as inputs to a shift register or RAM 102. Shift register 102 stores previously identified symbols from decision unit 100. These stored symbols are shifted to the left once each symbol period. The number of storage locations in shift register 102 should be large enough to accommodate the largest number of prior symbols that will be used by the equalizer. This largest number of prior symbols corresponds to the largest r that is expected. The value r may vary between 1 and m−1, and the largest value of r is typically equal to twice the maximum expected delay spread measured in symbol periods. The delay spread is the difference between the shortest and longest transmission time or path over the communication channel between the transmitter and the equalizer. Shift register 102 provides previously identified symbols to the multipliers. The multipliers form the products of the prior symbols stored in shift register 102 and the entries of the G matrix. Circular shift registers provide the appropriate entry from the G matrix to the multipliers. As these shift registers move a value to the top most position, the value in the top most position is moved to the lower most position. These shift registers contain m storage locations so that the m entries in the column matrices of equation 20 can be presented to the multiplier during a symbol period.

Multiplier 104 and shift register 106 are used to produce the product of prior symbol $S_{k-1}$ and a vector with entries $g_{12}$ through $g_{m2}$. Multiplier 108 and circular shift register 110 are used to form the product of prior symbol $S_{k-2}$ and a vector with entries $g_{13}$ through $g_{m3}$. The other multipliers and circular shift registers operate in a similar fashion until multiplier 112 and circular shift register 114 form the product of symbol of $S_{k-r-1}$ and a vector with entries $g_{14}$ through $g_{mr}$ it should be noted that if the value of r is less than the maximum number of locations in shift register 102, additional multipliers and circular shift registers associated with those unused locations are also unused. If the value of r is increased due to subsequent training, those locations may be used. The outputs from multipliers 104 through 112 are passed to summer 116 which forms the sum of the outputs. This sum is passed to shift register 118 which shifts the sum upward. Shift registers 106 to 114, and shift register 118 shift at the same time so that each new sum resulting from a shift by registers 106 to 114 is shifted into register 118. The shift registers do not necessarily shift at the sample rate; however, they shift m times per symbol period. The first shift for a symbol period moves the sum $g_{12} S_{k-1} + g_{13} S_{k-2} + \ldots + g_1, S_{k-r-1}$ into register 118, and the final or m shift for a symbol period move the sum $g_{m2} S_{k-1} + g_{m3} S_{k-2} + \ldots + g_{mr} S_{k-r-1}$ into register 118.

In reference to FIGS. 2 and 5 shift register 34 receives the samples from noise pre-whitening filter 32, and then transfers the m samples to register 120 each symbol period. Summer 122 then subtracts the sum in the upper most storage location of shift register 118 from the upper most location of register 120 to form a first difference which according to equation 20 is equal to $g_{11} S_k$. This value is passed to shift register 124. After register 124 stores this value, the second top most locations of shift registers 118 and 120 are enabled to summer 122. Summer 122 produces a difference that is equal to $g_{21} S_k$ in accordance with equation 20, and this value is passed to shift register 124. This process is continued until the final difference which is equal to $g_{m1} S_k$ is produced and passed to shift register 124. At this point, the storage locations of shift register 124 contain the value $S_k$ multiplied by a coefficient from the first column of the G matrix. Decision block 100 also has access to a storage device which stores coefficients $g_{11}$ through $g_{m1}$. By dividing the values from shift register 120 by the appropriate coefficient from register or RAM 126, decision unit 100 produces m estimates of the transmitted symbol $S_K$. Decision unit 100 can then, in a manner well-known in the art, output the transmitted symbol as $S_k'$ by determining which symbol in the known symbol constellation is closest to symbol $S_k$ that is derived from the values in register 124. It should be noted that since there are m cells in shift register 124, decision block 100 can make m separate decisions to produce m separate estimates of $S_k'$. These estimates can be used in a voting scheme if all the estimates are not the same so that a single or even double error will not result in an improper output by decision unit 100. For example, if five decisions indicate that $S_k'$ is equal to symbol A, and two decisions indicates that $S_k'$ is equal to symbol B, the output of decision block 100 will be that $S_k'$ is equal to symbol A. It is also possible to ignore certain inputs from shift register 124 when making a decision. For example, if the coefficient associated with $S_k$ from a particular storage location within register 124 is relatively small with respect to the other coefficients associated with $S_k$, that output from register 124 can be left out of the decision process. A relatively small value, for example, may be 0.001 times the largest coefficient associated with $S_k$. The implementation of FIG. 5 was described in terms of discrete hardware, but it is also possible for one skilled in the art to implement the functions carried out by FIG. 5 in software, executed by a programmable device such a programmable signal processing device, a microprocessor, a microcomputer or other hardware configurations. It should also be noted that the values of symbols S and coefficients g may be complex numbers.

The shift registers of FIG. 5 are controlled by controller 130. Controller 130 provides over all control to the equalizer, enables the outputs of shift register 118 and controls the shifting of all the shift registers. Controller 130 also receives inputs from register 34. When training symbols are being received controller 130 uses these inputs to calculate the entries of the G matrix as described earlier. After calculating these values, controller 130 transfers the appropriate values to the shift registers and storage device 126. Controller 136 may be implemented using devices such as a microprocessor. A microcomputer or another programmable device. It is also possible to implement controller 136 with specialized hardware. Controller may include internal RAM and/or ROM or it may uses external RAM and/or ROM. If the circuitry of FIG. 5 is implement in software, the same processor that executes the software may perform the functions of controller 130.

It should be noted that generally speaking, the equalizer of FIG. 5 stores the results of prior decisions by decision unit 100 to provide a collection of prior transmitted symbols. It is also possible to use one of the values from register 124, after it has been divided by the appropriate value in register 126, as a source of prior transmitted symbols. The equalizer uses these prior symbols and a model of the present communication channel transmission characteristics to determine what effect the prior symbols have on the present symbol being received. This effect is subtracted from the signal being received so that the latest symbol can be identified. The initial decisions that identify prior symbols result from the training symbol set where the received symbols are known apriori. In addition to supplying initial inputs to register 102, these training symbols are used by controller 130 to model the communication channel, that is, determine the value of r and the entries of the G matrix.

I claim:

1. A method for identifying symbols represented by a received signal from a communication channel comprising:

sampling said received signal beginning at a first time to produce a first plurality of initial samples of a first symbol;

sampling said received signal beginning at a second time to produce a second plurality of initial samples of a second symbol, said second time being one symbol period after said first time;

using said first and second plurality of initial samples to produce a time averaged auto-correlation matrix;

performing a singular value decomposition of said time averaged auto-correlation matrix to produce a diagonal matrix;

determing a value r by comparing values along a diagonal of said diagonal matrix to identify a location along said diagonal where a ratio of adjacent values crosses a predetermined threshold;

identifying a symbol represented by said received signal using a third plurality of samples of said received signal and a plurality of consecutive prior symbols, said plurality of prior symbols having at least r–1 prior symbols, and said third plurality of samples having at least two samples being less than one symbol period apart.

2. The method of claim 1, wherein said step of sampling said received signal beginning at a first time comprises taking m samples of said received signal to produce a first initial vector comprising m first initial samples, m being an integer greater than r, and further comprising the step of using said first initial vector to form a first auto-correlation matrix.

3. The method of claim 2, wherein said step of sampling said received signal beginning at a second time comprises taking m samples of said received signal to produce a second initial vector comprising m second initial samples, and further comprising the step of using said second initial vector to form a second auto-correlation matrix.

4. The method of claim 3, further comprising the step of forming said time averaged auto-correlation matrix by summing said first and said second auto-correlation matrices.

5. The method of claim 1, wherein using said plurality of prior consecutive symbols comprises forming a plurality of products by multiplying each of said prior symbols by a coefficient.

6. The method of claim 5, further comprising forming a sum of said products and subtracting said sum from at least one of said third plurality of samples of said received signal.

7. The method of claim 1, wherein said third plurality of samples of said received signal comprises m samples of said received signal taken within one symbol period to form a symbol vector, where m is an integer greater than r.

8. The method of claim 7, further comprising the step of forming a plurality of product vectors by multiplying each of said r−1 prior consecutive symbols by a m entry matrix.

9. The method of claim 8, further comprising the step of summing said plurality of product vectors to produce a sum vector and subtracting said sum vector from said symbol vector.

* * * * *